(12) United States Patent
Johnson et al.

(10) Patent No.: US 9,108,123 B2
(45) Date of Patent: Aug. 18, 2015

(54) STEAM EFFICIENCY WITH NON DEPLETIVE CONDENSING AND ADIABATIC SOLVENT HEATING

(75) Inventors: Dennis W. Johnson, Simpsonville, SC (US); James H. Brown, Simpsonville, SC (US); Jon Peeples, Taylors, SC (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 0 days.

(21) Appl. No.: 13/559,447

(22) Filed: Jul. 26, 2012

(65) Prior Publication Data

US 2014/0026755 A1    Jan. 30, 2014

(51) Int. Cl.
*B01D 19/00* (2006.01)
*B01D 53/14* (2006.01)

(52) U.S. Cl.
CPC ............ *B01D 19/00* (2013.01); *B01D 53/14* (2013.01); *B01D 53/1425* (2013.01); *B01D 53/1456* (2013.01)

(58) Field of Classification Search
CPC ...................................................... B01D 19/00
See application file for complete search history.

(56) References Cited

U.S. PATENT DOCUMENTS

| | | | |
|---|---|---|---|
| 5,344,627 A | | 9/1994 | Fujii et al. |
| 2006/0144229 A1* | | 7/2006 | Kalmari ..................... 95/149 |
| 2007/0256559 A1 | | 11/2007 | Chen et al. |
| 2010/0050637 A1 | | 3/2010 | Yamashita et al. |
| 2011/0120128 A1* | | 5/2011 | Handagama et al. ........... 60/649 |
| 2011/0232286 A1* | | 9/2011 | Mishima et al. ................ 60/670 |
| 2012/0096865 A1 | | 4/2012 | Murakami et al. |

FOREIGN PATENT DOCUMENTS

| | | |
|---|---|---|
| GB | 2470645 | 8/2011 |
| WO | 2011/019335 | 2/2011 |
| WO | 2011/073671 | 6/2011 |

* cited by examiner

*Primary Examiner* — Duane Smith
*Assistant Examiner* — Cabrena Holecek
(74) *Attorney, Agent, or Firm* — Fish & Tsang, LLP

(57) ABSTRACT

A lean solvent is produced from a $CO_2$ rich solvent using heat exchange with a conditioned stream in a reboiler. A power generator generates a low pressure steam from high pressure steam. A portion of the low pressure steam is sent to a fluid conditioning unit, which conditions the low pressure steam to a temperature and pressure required to allow for the production of lean solvent from a rich solvent in a reboiler.

8 Claims, 8 Drawing Sheets

Figure 1 "Prior Art"

STEAM EFFICIENCY WITH NON DEPLETIVE CONDENSING AND ADIABATIC SOLVENT HEATING

FIELD OF THE INVENTION

The field of the invention is systems and methods of using turbine exhaust steam to produce a lean solvent.

BACKGROUND

The following background description includes information that may be useful in understanding the present invention. It is not an admission that any of the information provided herein is prior art or relevant to the presently claimed invention, or that any publication specifically or implicitly referenced is prior art.

Generally, power plants that are or will be equipped with a carbon dioxide (also referred to as "$CO_2$") capture system use various configurations for the turbine/boiler steam cycle. One typical turbine cycle comprises high pressure, intermediate pressure, low pressure and boiler feedwater portions where low pressure steam is condensed separately from higher pressure steam. For instance, steam leaving the low pressure and boiler feedwater pump turbine is sent to a condenser to condense the steam, which can be recycled. Steam from another portion of the turbine cycle is condensed in a heat exchanger known as a reboiler and used to heat rich solvent to release $CO_2$. Consequently, available heat from the low pressure steam is lost because the two steam condensing processes are distinct from one another.

In general, various processes for $CO_2$ capture and steam cycle integration are known in the art. For example, U.S. Pat. Publ. No. 2007/0256559 to Chen et al. describes separating a gas from a gas stream emitted by a power plant, by injecting a low pressure steam from a turbine into a stripper. However, Chen's process of directly injecting steam into the stripper limits the applicability of Chen's process because the addition of water into the stripper can be undesirable depending on the solvent circuit used.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods of using turbine exhaust steam to heat rich solvent from a $CO_2$ capture process.

SUMMARY OF THE INVENTION

The inventive subject matter provides apparatus, systems and methods for regenerating a lean solvent from a $CO_2$ rich solvent. It is generally preferred that a power generator is configured to receive a high pressure steam and produce a low pressure steam. A portion of the low pressure steam is received by a fluid conditioning unit, which can comprise one or more components including, for example, a blend station, a compressor, and a heat exchanger. The fluid conditioning unit produces a conditioned stream, a portion of which can be fed into a reboiler and used to produce a lean solvent from the $CO_2$ rich solvent.

In another aspect, methods of regenerating a lean solvent from a $CO_2$ rich solvent are contemplated. In a preferred method, a low pressure steam can be produced in a power generator, and a portion of the low pressure steam can be conditioned in a fluid conditioning unit to produce a conditioned stream. It is contemplated that the conditioning can be performed by mixing a portion of the low pressure steam with a second stream using a blend station. However, any commercially suitable process for conditioning a stream could alternatively be used. At least a portion of the conditioned stream can then be used to heat a $CO_2$ rich solvent, to thereby produce a lean solvent.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including a reduction in the size of the condenser equipment required to condense the stream fed to the reboiler, energy conservation, and optimization in the integration of $CO_2$ capture within a power plant.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Generally, a system is described that regenerates a lean solvent from a $CO_2$ rich solvent. The system preferably comprises a power generator, a fluid conditioning unit, and a reboiler. First, a high pressure steam can be fed into a power generator, which produces a low pressure steam. Thereafter, a portion of the low pressure steam is fed into a fluid conditioning unit, which is configured to produce a conditioned stream. The conditioned stream is preferably at a temperature and pressure to allow for regeneration of a lean solvent stream from a $CO_2$ rich solvent through heat exchange.

Preferably, a reboiler receives at least a portion of the conditioned stream and produces the lean solvent using the portion of conditioned stream. The heat exchange between the conditioned stream and the $CO_2$ rich solvent can be such that the conditioned stream is condensed. It should be appreciated that using a portion of the low pressure steam for conditioning and, ultimately, heating the $CO_2$ rich solvent increases the efficiency of the $CO_2$ capture process because the amount of low pressure steam to process in the condenser downstream from the power generator is reduced, thereby reducing a size and/or duty of a downstream condenser. In addition, intermediate pressure steam can alternatively be used for power generation rather than being diverted to the $CO_2$ capture process as in prior art processes.

Figure 1:
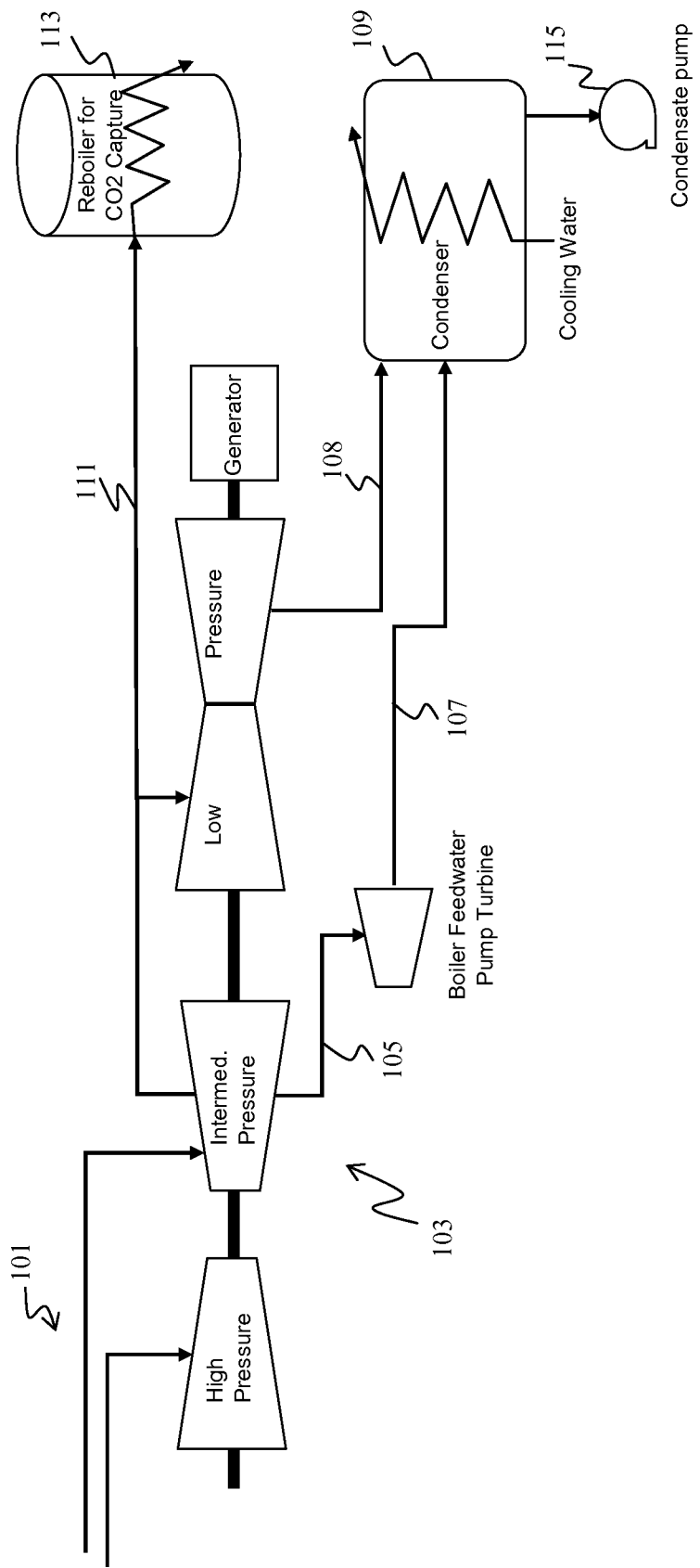
FIG. 1 is a schematic of a power cycle with a high pressure turbine, an intermediate pressure turbine, a low pressure turbine, and a boiler feedwater pump turbine, where a portion of an intermediate pressure stream is diverted to a reboiler for $CO_2$ capture.

In FIG. 1, a prior art power cycle is illustrated that contains a high pressure stream 101 that is fed into a power generator 103 that includes a high pressure turbine, an intermediate pressure turbine, a low pressure turbine, and an optional boiler feedwater pump turbine which could also be driven by an electric motor. The power generator 103 produces an intermediate pressure stream 111, which can be fed into a reboiler 113 and used to heat rich solvent to thereby release $CO_2$ and regenerate a lean solvent. The intermediate pressure stream 111 for the reboiler is normally a saturated stream at 40-100 psia or higher. In one example, steam at 70 psia saturated, about 303° F., was used in a reboiler. A portion of the intermediate pressure stream 111 can be fed into the low pressure turbine to produce a low pressure stream 108. A second intermediate pressure stream 105 can be fed into the boiler feedwater pump turbine to produce stream 107. Streams 107 and 108 are saturated at a low pressure, and can be sent to a condenser 109. The condensed steam is then returned to the cycle through condensate pump 115.

In typical processes for using steam from a turbine to heat a rich solvent, steam condensing is necessary to (1) achieve the highest possible steam cycle efficiency; and (2) provide the energy required to heat solvent from a carbon dioxide capture in order to release the $CO_2$. However, as noted in the prior art cycle, separate processes are typically used for the steam condensing required to heat a rich solvent and achieve a high steam cycle efficiency (i.e., FIG. 1, stream 111 is distinct from 107-108). As a result, available heat from the low pressure stream is lost, which could have been used to heat the rich solvent.

Using low pressure steam to heat a rich solvent in a reboiler provides a number of challenges. For example, the steam conditions are different in a condenser than required for a reboiler. Typically, steam to the condenser has a pressure near atmospheric or under a slight vacuum, whereas the reboiler requires a stream having a higher temperature and pressure.

Figure 2:
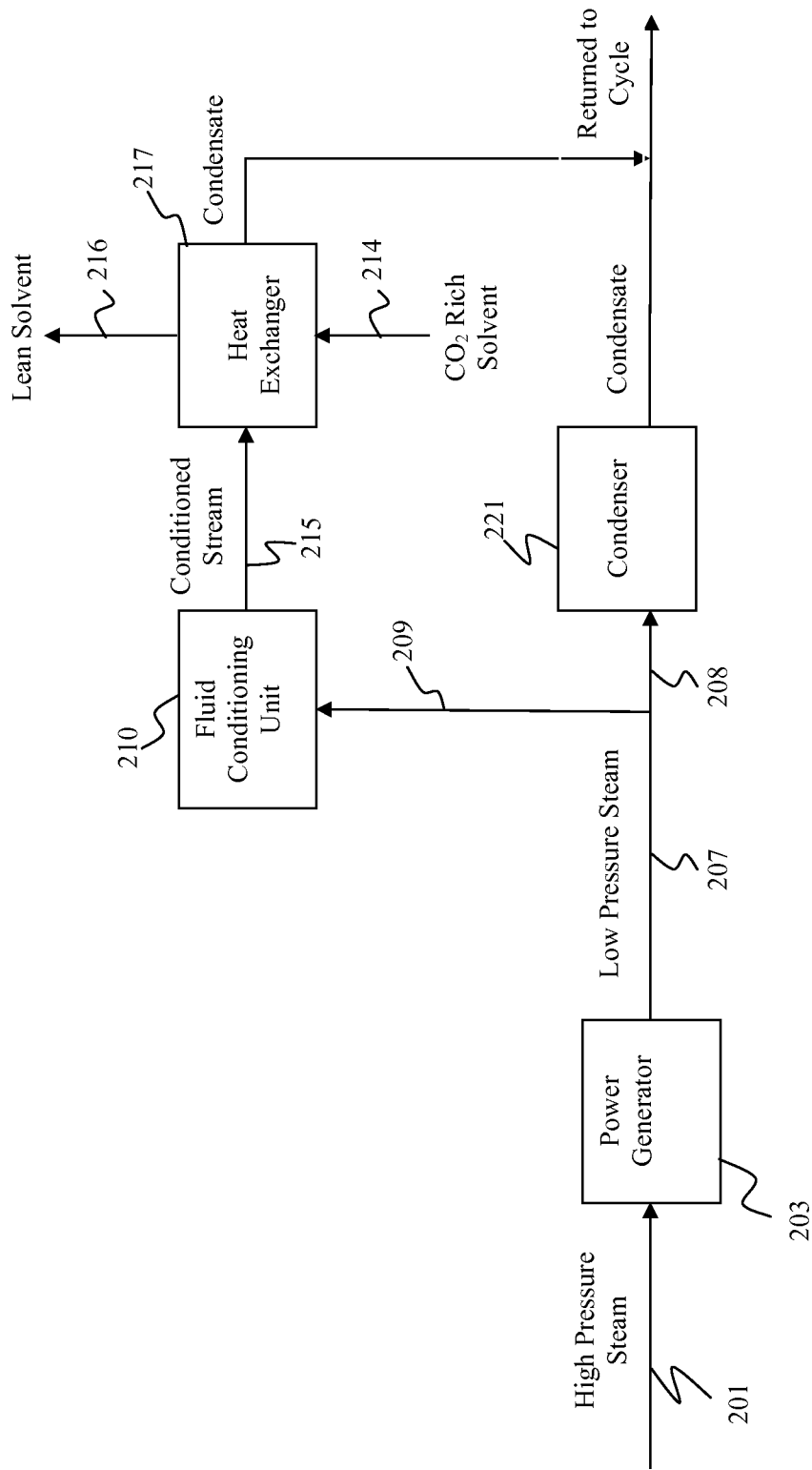
FIG. 2 is a schematic of an exemplary embodiment of a system that regenerates lean solvent using a low pressure stream.

To utilize the low pressure stream, Applicants have discovered that the low pressure stream can be conditioned prior to being fed into a reboiler. For example, in FIG. 2, high pressure steam 201 is fed into a power generator 203, which thereby produces low pressure steam 207. Typically, the low pressure steam 207 is saturated. A portion 209 of the low pressure steam is fed into a fluid conditioning unit 210, which thereby conditions the steam to a temperature and pressure needed to generate lean solvent from the rich solvent 214 in a reboiler 217 or other heat exchanger. Any commercially suitable conditioning unit(s) could be used to condition the low pressure steam including, for example, a blend station, a compressor, and a heat exchanger. Moreover, the fluid conditioning unit 210 could comprise of a plurality of units to condition the steam to requisite conditions for the reboiler 217. In contemplated systems, the remaining portion of the low pressure steam 208 can be fed to a condenser 221. The percentage of low pressure steam sent to the fluid conditioning unit 210 as opposed to the condenser 221 could vary depending on the requirements needed for the overall process. Furthermore, the condenser 221 could use water, air, a heat transfer medium, or any combination thereof to condense the steam such that the condensate can be pumped back into the cycle.

Preferably, the conditioned stream 215 from the fluid conditioning unit 210 is saturated and has a pressure of between 40 to 100 psi. Some or all of the conditioned stream 215 is fed into reboiler 217, where the stream is condensed and a lean solvent 216 is produced by heat exchange contact between the conditioned stream 215 and the rich $CO_2$ solvent 214. In preferred embodiments, the reboiler 217 is a unit where a lean solvent is produced via heating of a $CO_2$ rich solvent by use of the conditioned stream. The remainder of the low pressure steam 208 can be fed into a condenser 221 to produce condensate. The condensed streams of the reboiler 217 and condenser 221 can then be returned to the cycle.

The power generator 203 can comprise of high pressure, intermediate pressure, low pressure and/or boiler feedwater pump turbines, although the specific configuration of the power generator 203 can vary depending on the application. In such a configuration, it is contemplated that incoming high pressure steam 201 can enter into one or multiple turbines, and low pressure steam 207 is produced. Moreover, the power generator 203 can produce multiple streams each of which can have a different pressure range, such as a low and an intermediate pressure stream.

Figure 3:
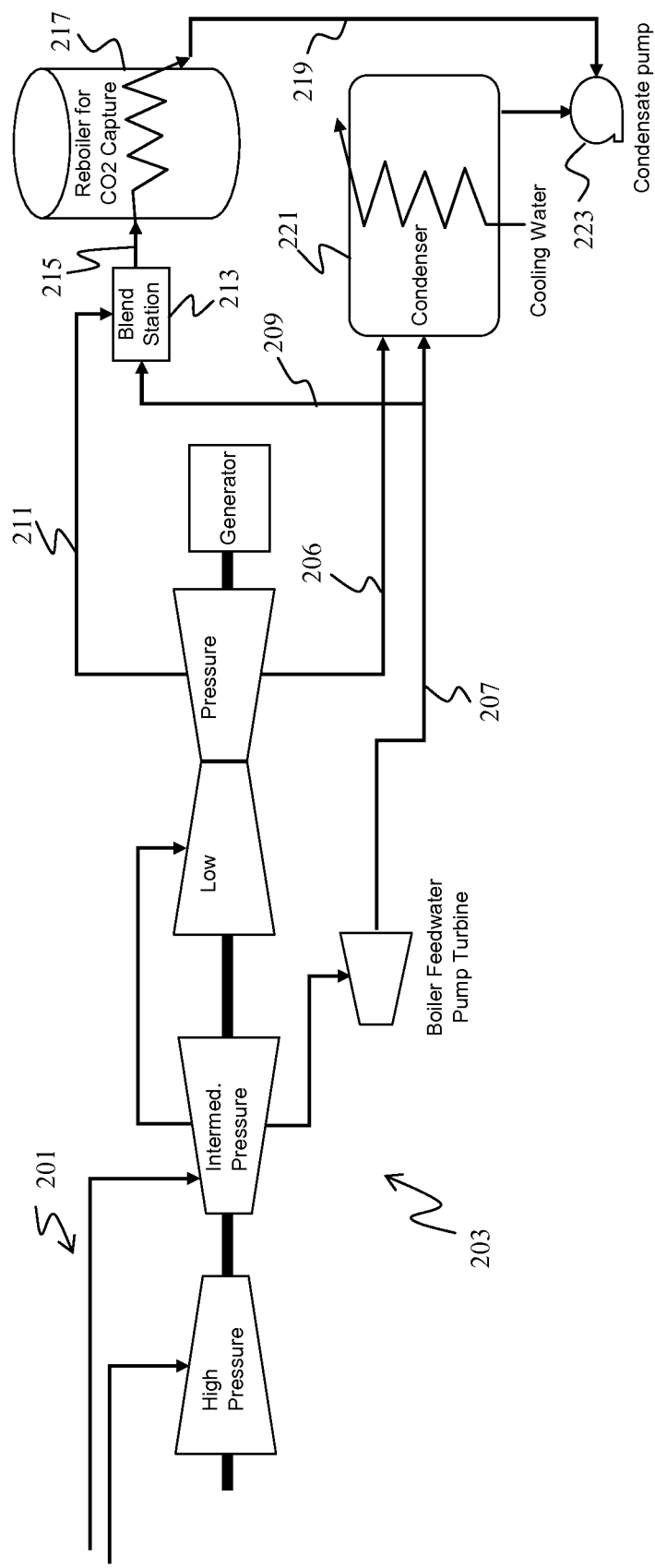
FIG. 3 is a schematic of another embodiment of a system for regenerating lean solvent that uses steam blending to condition a stream to reboiler conditions.

In some contemplated embodiments, the fluid conditioning unit 210 can comprise of a blend station 213 that mixes the portion of the low pressure steam 209 with a second stream 211 having a pressure greater than the low pressure stream. An illustrative embodiment of a system having a fluid conditioning unit comprising a blend station is shown in FIG. 3. A high pressure steam 201 enters a power generator 203 comprising high, intermediate, low pressure, and boiler feedwater pump turbines. A low pressure steam 206 and/or 207 is produced by the power generator 203, preferably from the low pressure and boiler feedwater turbine portions. A portion of the low pressure steam 209 is diverted to a blend station 213. In a preferred embodiment, the portion of the low pressure steam 209 could comprise low pressure steam 206 and 207 from the low pressure turbine and the boiler feedwater pump turbine, respectively. Alternatively, the portion of the low pressure steam 209 could simply comprise low pressure steam 206 or 207. Nevertheless, it is contemplated that the low pressure steam 209 could vary in composition with respect to low pressure steam 206 and/or 207. Finally, the low pressure steam 206 and/or 207 could be combined prior to diverting a portion of the low pressure steam 209 to the blend station 213.

The blend station 213 mixes the portion of the low pressure steam 209 with a second stream 211 having a pressure greater than that of the portion of the low pressure steam 209. The second stream 211 is preferably a product of a low pressure turbine, although it is contemplated that the second stream 211 could be generated using any commercially suitable process. It is further contemplated that the second stream 211 can comprise a reheated steam or a product from a supplemental or auxiliary source. If superheated steam is used, then desuperheating can be used to saturate the stream. The blending of the second stream 211 and the portion of the low pressure steam 209 produces a conditioned stream 215, preferably at a temperature and pressure sufficient to allow for generation of a lean solvent from a $CO_2$ rich solvent in reboiler 217. From the reboiler 217, the conditioned stream 215 is condensed 219 and fed to condensate pump 223, which can send the condensate back to the cycle.

Figure 4:
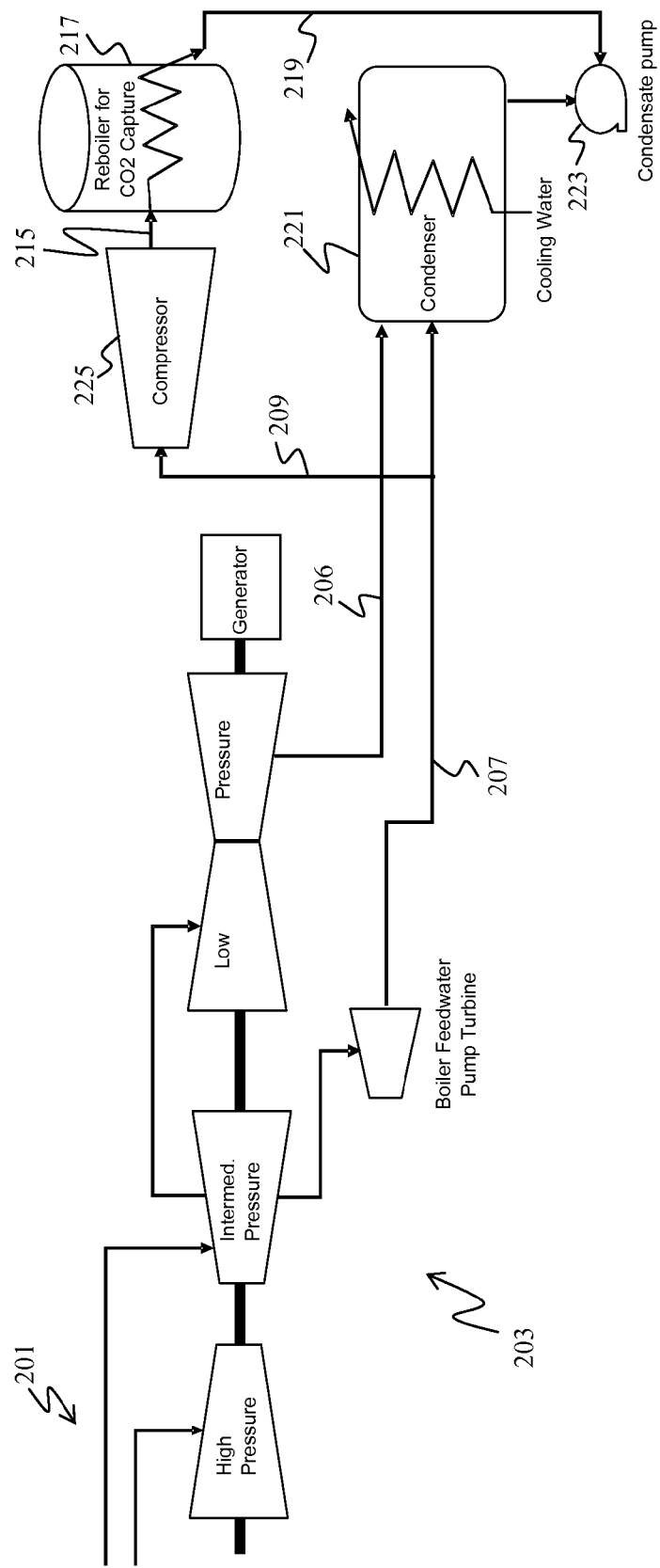
FIG. 4 is a schematic of yet another embodiment of a system for regenerating lean solvent that uses a steam compressor to pressurize a stream to the required reboiler conditions.

In other contemplated embodiments, the fluid conditioning unit 210 can alternatively comprise a compressor 225, such as shown in FIG. 4. With respect to similarly numbered elements, the description above applies. Similar to the other embodiments, a high pressure steam is fed into a power generator that produces a low pressure steam. A compressor 225 is used to compress a portion of the low pressure steam 209. The compressor 225 can be a steam or electrical driven compressor, a blower, a fan, or other device suitable to pressurize the portion of the low pressure steam 209 and provide the conditions necessary for the reboiler 217 in the conditioned stream 215.

Figure 5:
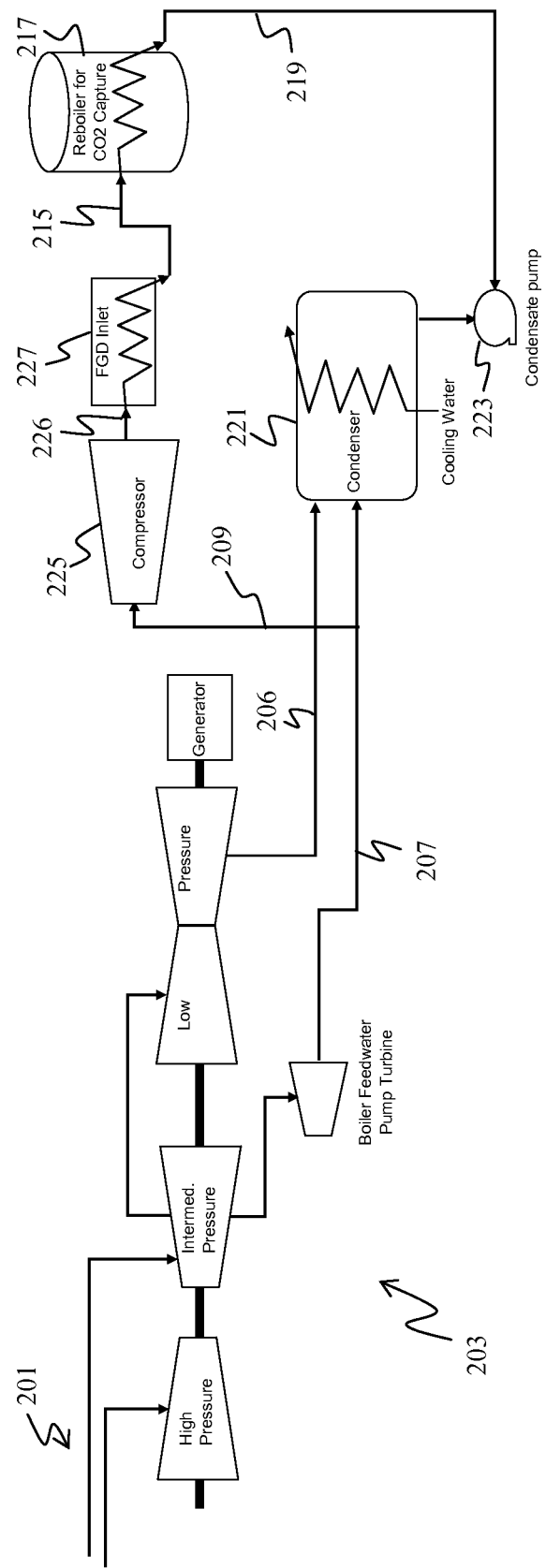
FIG. 5 is a schematic of another embodiment of a system for regenerating lean solvent that uses a compressor and a heat exchanger supplying energy to a stream for the required reboiler conditions.

In still other contemplated embodiments shown in FIG. 5, a compressor 225 fluidly coupled to a heat exchanger 227 can be used to condition low pressure steam from the power generator 203. The heat exchanger 227 can advantageously be used to supply additional thermal energy to compressed stream 226. In one configuration, the heat exchanger can be configured to allow for heat exchange contact between compressed stream 226 and a heated stream from an upstream process. In preferred embodiments, the heated stream can comprise a flue gas stream. Typically, in such configuration the likely location would be upstream of a flue gas desulfurization (FGD) unit, where the flue gas temperature is typically about 260-320° F. depending upon the fuel and design. However, use of the flue gas as a heat exchange medium may require that the heat exchanger be made from corrosion resistant materials due to the presence of acid gases in the flue gas, such as $SO_3$, $SO_2$, and HCl.

Figure 6:
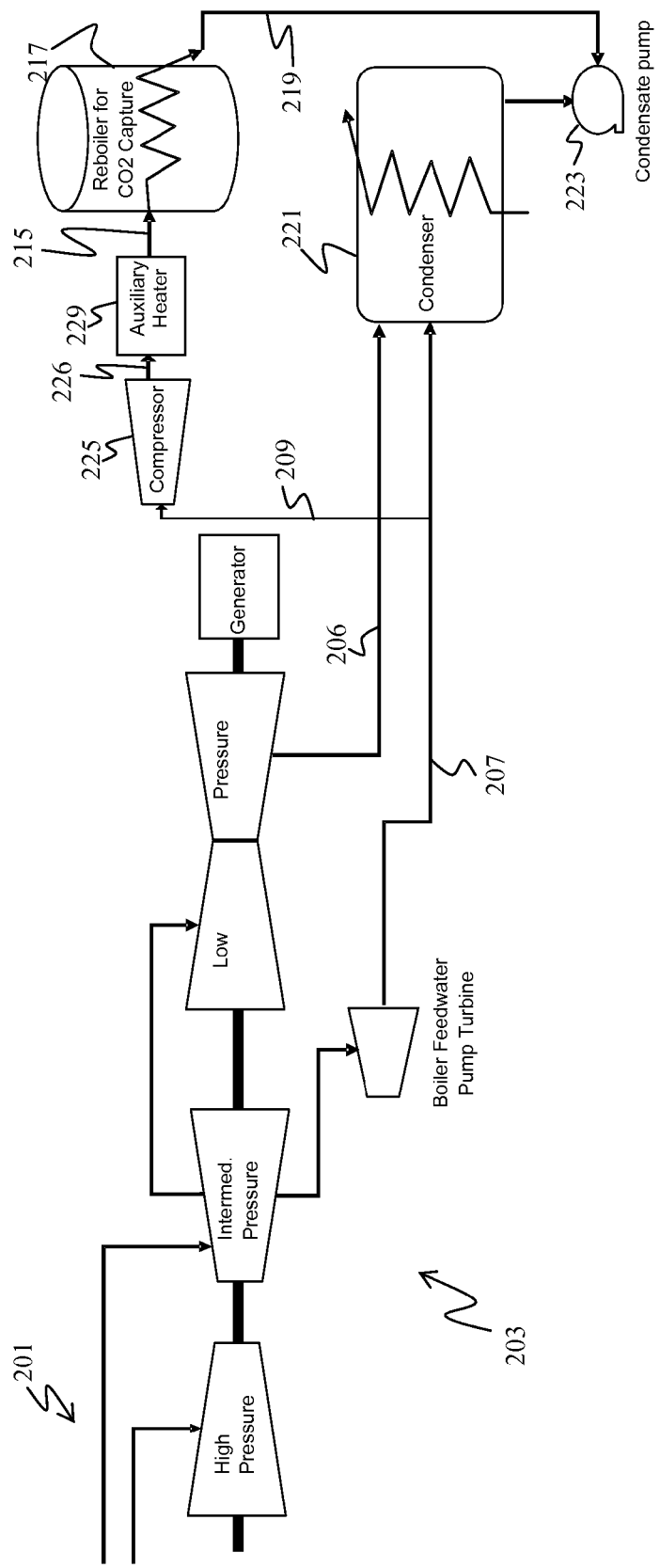
FIG. 6 is a schematic of another embodiment of a system for regenerating lean solvent that uses a compressor and an auxiliary heater to supply energy to a stream to the required conditions for a reboiler.

In another preferred embodiment, the compressor 225 can be coupled to an auxiliary heater 229 wherein the auxiliary heater receives the compressed stream 226 and produces the conditioned stream 215 as shown in FIG. 6. Further, the auxiliary heater 229 preferably comprises utilizing heat from an external source or heat from at least one of an airheater, an outlet of a fabric filter or an electrostatic precipitator, or inlet stream of a FGD unit.

Figure 7:
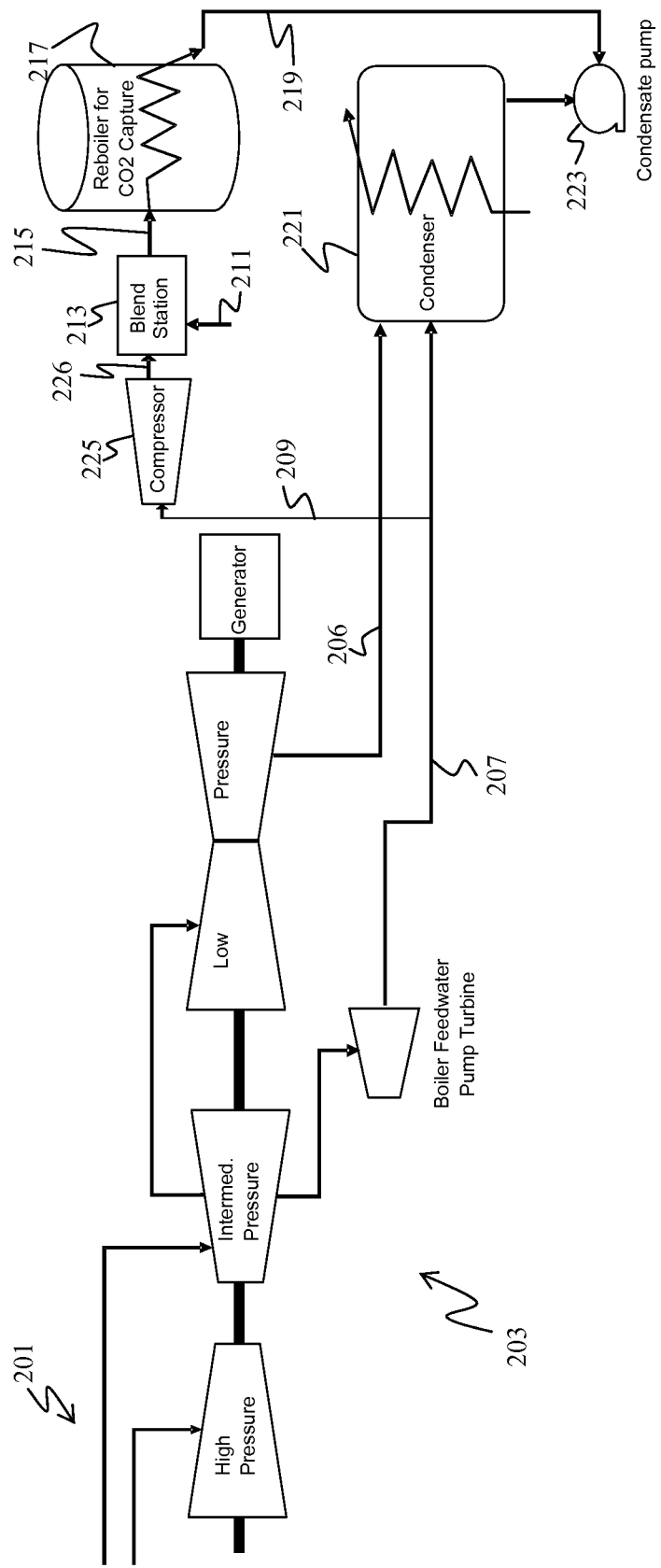
FIG. 7 is a schematic of another embodiment of a system for regenerating lean solvent that uses a compressor and a blend station to supply energy to a stream to the required reboiler conditions.

The configurations of the fluid conditioning unit 210 are not limited to those embodiments described above. It is contemplated that the fluid conditioning unit could comprise other combinations of the above-described components that are not described, such as a single heat exchanger as the conditioning unit to condition the portion of the low pressure steam. Another example can comprise of the conditioning unit 210 including a blend station 213 that is configured to receive a compressed stream 226 from the compressor 225 and a second stream 211 wherein a conditioned stream is produced as shown in FIG. 7.

Figure 8:
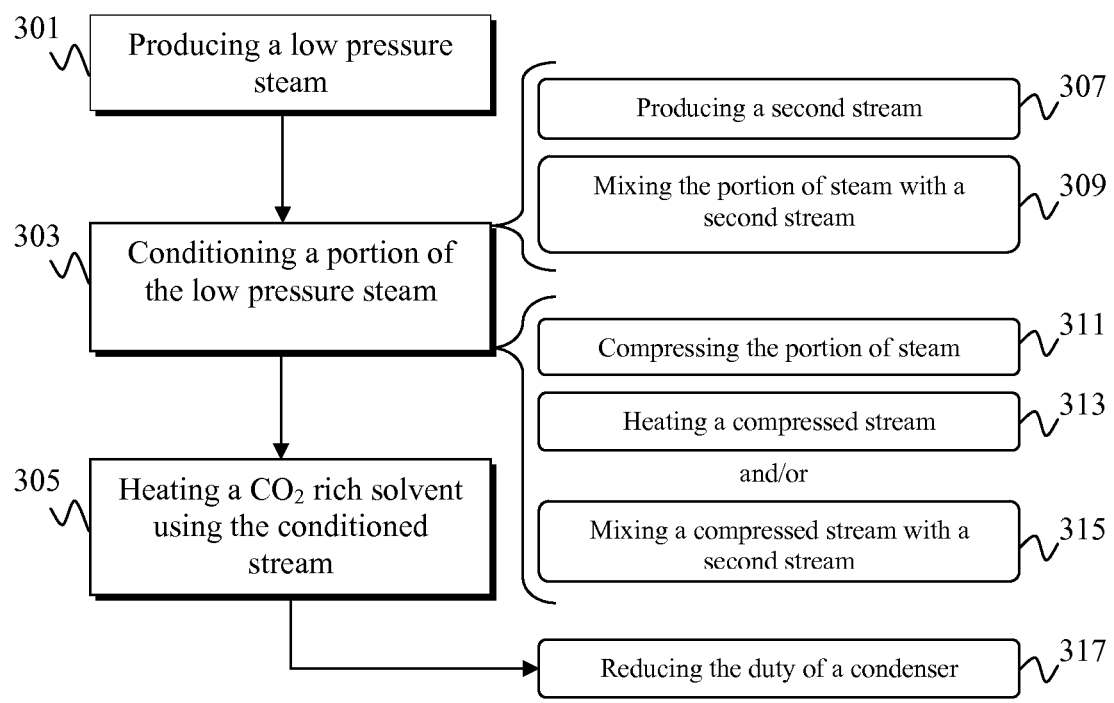
FIG. 8 is a flow chart of an embodiment of a method of producing a lean solvent.

In yet another aspect, methods of regenerating a lean solvent from a $CO_2$ rich solvent are disclosed. In an exemplary embodiment shown in FIG. 8, a method can include the steps of: (1) producing a low pressure steam in a power generator 301; (2) conditioning at least a portion of the low pressure steam in a fluid conditioning unit to produce a conditioned stream 303; and (3) heating a $CO_2$ rich solvent using the conditioned stream to produce a lean solvent 305. In applying this method, energy production of the power generator is increased by extracting pressure from the intermediate pressure stream rather than feed the intermediate pressure steam to the reboiler. In addition, the amount of power required for $CO_2$ sequestration is reduced. Furthermore, by using the heat from the low pressure steam that is normally rejected to the atmosphere, the efficiency is improved and the costs are reduced.

Furthermore, the conditioning of a portion of the low pressure steam 303 can comprise of a plurality of steps. For instance, the conditioning can comprise of mixing a portion of the low pressure steam with a second stream 309 using a blend station. In such process, it is contemplated that a step of producing the second stream 307 can comprise of using a low pressure turbine, a feedwater heater, and a superheater steam generator. Moreover, the conditioning of a portion of low pressure steam 303 can comprise of a compressor to compress the portion 311. In such configuration, it is contemplated that a compressed stream produced by the compressor can be either heated 313 and/or mixed with another stream 315. However, such methods can be configured in a manner such that the mere compressing of the portion of the low pressure stream produces a conditioned stream. Finally, the methods provided can reduce the duty of a condenser 317 downstream from the power generator.

Many of the individual components of this method have been described above, and with respect to those components, the description above applies. Moreover, it is contemplated that the method described above can include at least the combinations of the system described above. For example, a flue gas stream, typically upstream from a flue gas conditioning unit, can exchange heat with a compressed stream from a compressor, such that a conditioning stream is produced.

It is contemplated that the systems and methods described above can be applied in operations other than power generation and $CO_2$ capture. For instance, the systems and methods can be applied to fossil fuel fired plants that have a condenser and carbon dioxide capture, including those fired with coal, gas, oil, coke, diesel, oil-derived fuels, bitumen, etc. Additionally, applications with biomass firing, waste to energy, biodiesel, and ethanol can be modified to better benefit in energy management using the techniques described above.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system that regenerates a lean solvent from a $CO_2$ rich solvent that includes an intermediate pressure steam having a pressure of between 40-100 psia, comprising:
   a power generator configured to receive a high pressure steam having a pressure greater than the intermediate pressure steam and produce a low pressure steam having a pressure less than the intermediate pressure steam;
   a fluid conditioning unit configured to receive a first portion of the low pressure steam from the power generator and produce a conditioned stream;
   a condenser configured to receive a second portion of the lower pressure stream from the power generator and produce a condensed stream; and
   a heat exchanger configured to (a) receive the conditioned stream and a $CO_2$ rich solvent, and (b) produce a lean solvent from the $CO_2$ rich solvent using the conditioned stream.

2. The system of claim 1, wherein the fluid conditioning unit comprises a blend station configured to mix at least the first portion of the low pressure steam with a second stream having a pressure that is greater than the low pressure stream but less than the high pressure steam.

3. The system of claim 2, wherein the second stream comprises a product from at least one of a low pressure turbine, a feedwater heater, and a superheated steam generator.

4. The system of claim 1, wherein the fluid conditioning unit comprises a compressor.

5. The system of claim 4, wherein the fluid conditioning unit further comprises a heat exchanger configured to receive a compressed stream from the compressor and produce the conditioned stream via heat exchange contact.

6. The system of claim 5, wherein the conditioned stream is produced via heat exchange contact with a flue gas stream.

7. The system of claim 4, wherein the fluid conditioning unit further comprises an auxiliary heater configured to receive a compressed stream from the compressor and produce the conditioned stream.

8. The system of claim 4, wherein the fluid conditioning unit further comprises a blend station configured to (a) receive a compressed stream from the compressor and a second stream, and (b) produce the conditioned stream, and wherein the second stream has a pressure that is greater than the low pressure stream but less than the high pressure steam.

* * * * *